United States Patent [19]

Crandell

[11] 4,120,086
[45] Oct. 17, 1978

[54] METHOD OF MAKING ELECTRICALLY HEATED NOZZLE

[75] Inventor: Walter R. Crandell, Addison, Ill.

[73] Assignee: Fast Heat Element Manufacturing Co., Elmhurst, Ill.

[21] Appl. No.: 705,996

[22] Filed: Jul. 16, 1976

Related U.S. Application Data

[63] Continuation-in-part of Ser. No. 516,618, Oct. 21, 1974, Pat. No. 3,970,821.

[51] Int. Cl.² .............................................. H05B 3/00
[52] U.S. Cl. ........................................ 29/611; 29/614; 425/144
[58] Field of Search ................ 29/611, 613, 614, 615, 29/618, 619; 219/510, 523, 541, 544, 552, 553; 338/238, 239, 240, 242, 273, 274; 425/143, 144, 145, 243, 247; 259/191

[56] References Cited

U.S. PATENT DOCUMENTS

| | | | |
|---|---|---|---|
| 2,436,869 | 3/1948 | Lester | 425/144 |
| 2,472,145 | 6/1949 | Cappell | 29/614 X |
| 2,475,395 | 7/1949 | Lester | 425/144 |
| 2,814,070 | 11/1957 | Bulkley et al. | 425/144 |
| 2,831,951 | 4/1958 | Desloge | 29/614 X |
| 3,217,279 | 11/1965 | Boggs | 338/239 |
| 3,310,769 | 3/1967 | Simmons | 338/241 |
| 3,499,189 | 3/1970 | Perras | 425/144 |
| 3,751,014 | 8/1973 | Waterloo | 425/144 X |

*Primary Examiner*—Victor A. DiPalma

[57] ABSTRACT

An electrically heated nozzle device for plastic molding or die casting equipment having a novel casing with an integral heater core, and means to seal the casing for retaining the heater core in place and to electrically insulate the electrical heating element from the casing and prevent loss of thermal transmitting packing contained in the casing, which is structured to receive the heater core in the area close to its passage for carrying molten material to be molded or cast in a forming cavity, and which may be shaped. The casing may also include a probe for a thermocouple or a thermocouple well for sensing temperature; and the method includes the steps of arranging an unsheathed electric heating element in a bore formed in the nozzle casing in proximity to its molding material orifice, filling the bore with heat transmitting electrical insulation embedding an electric heating element, compacting the insulation about the heating element and in the bore to eliminate air voids, and sealing the bore. The method may also include the steps of assembling in the nozzle casing a body of relatively flexible green ceramic particles impregnated in heat dissipatable material and embedding a resistance wire heating element in the body, heating the assembly to bake out the heat dissipatable material and sinter the ceramic particles together, and compacting the assembly to eliminate air voids therein and between the casing and said assembly. Also disclosed herein in a heater body embodying modified features of the invention.

14 Claims, 11 Drawing Figures

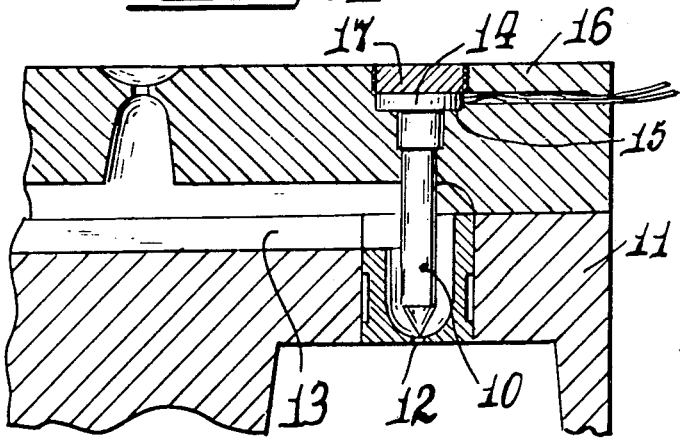
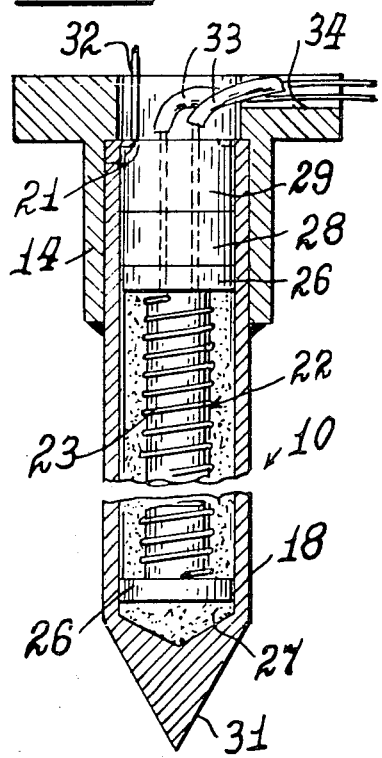
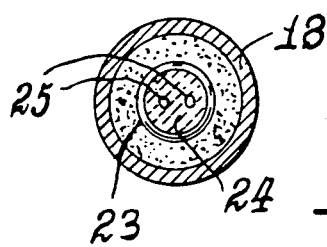
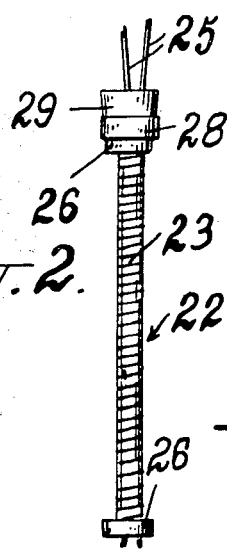
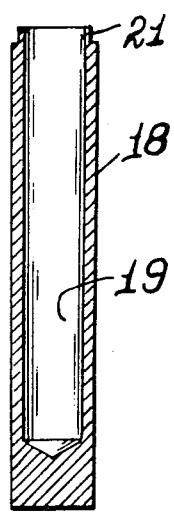
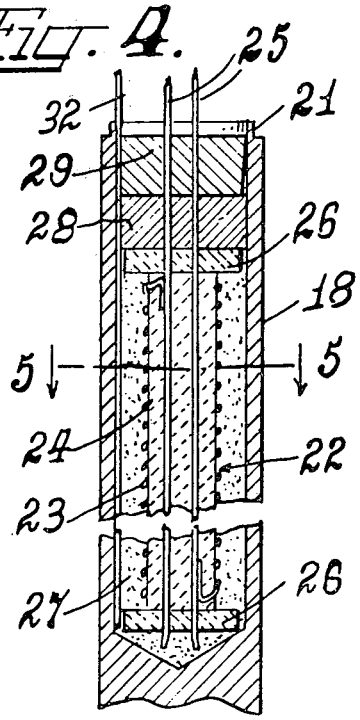
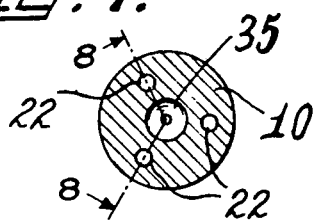

METHOD OF MAKING ELECTRICALLY HEATED NOZZLE

This application is a continuation-in-part of my application Ser. No. 516,618, filed Oct. 21, 1974, now U.S. Pat. No. 3,970,821, granted July 20, 1976.

This invention relates to improvements in electrically heated nozzles, including torpedos, spreaders and heater bodies, for plastic molding or die casting equipment, and to the method of making same. Such devices may be inserted into the orifice of the sprue fitting of the equipment to maintain the temperature of the material flowing therethrough during ejection into a mold or die. The nozzle includes an integral internal heater body comprised of an insulated heater coil, which may have at its ends frangible ceramic spacer discs for holding the heater body axially spaced from the walls of its metal casing. The resistance wire is connected to leads that extend through holes in the discs and project out of the assembly for connection with a source of electric current. The space inside the casing, not occupied by heater coil and leads, is filled and packed with magnesium oxide powder or similar heat transfer or ceramic material, such as aluminum oxide or boron nitride, to maintain a high heat transfer between the coil and casing and to provide electrical insulation between the coil and casing. One end of the casing may be tapered so that the bushing can function as a valve needle in the flow orifice.

By using an assembly of relatively flexible strips of green ceramic particles impregnated in heat dissipatable material in place of insulation powders and winding resistance wire on the strips, and then heating the assembly to bake out the heat dissipatable material and sinter the ceramic particles together, the assembly may be fabricated into an integral unit to conform to any surface to be heated with the heater wires embedded in ceramic insulation.

By selectively using a combination of the green ceramic heat dissipatable material in conjunction with insulation powder, the heater coil embedded therein, and then baking out the heat dissipatable material and sintering the ceramic particles together, the assembly may be fabricated in a shorter time with varied heat insulation and heat transmission but good electrical insulation characteristics, as to direct heat to the molding orifice and away from other parts of the nozzle.

The heater-casing assembly must be compressed to eliminate air voids, usually by swaging or rolling, which compacts the magnesium oxide powder or ceramic insulation material firmly between the heater body and casing to insure that all voids in the casing are filled. The heated nozzle assembly is formed as an integral unit, thus affording optimum heat transfer characteristics between the heating core and casing. The open end of the nozzle casing may be rolled over suitable removable fiber and nylon discs placed at the related end of the heater bore to prevent slippage or loss of heater components during assembly and swaging of the device.

It is therefore an object of the invention to provide a unitary heated nozzle of the character referred to.

Another object is to provide a heated nozzle of the character referred to with novel means to close the open end of its casing to retain the heater element in place therein.

Another object is to provide a heated nozzle of such character that the heater element therein terminates closely adjacent to its flow channel and the shaped end of its casing to insure uniform heating of the entire flow area of the nozzle in which it is encased.

Another object is to provide a compressed heater assembly integral with and in a nozzle device of a given minimum size capable of producing high operating temperatures.

Another object is to provide an integral heated nozzle device without air voids therein.

Another object is to provide compacted insulation in and unitary with a heated nozzle which may be varied as to direct maximum heat to its flow passage.

Another object is to provide a heated nozzle of such a character which is not difficult or expensive to manufacture and which is very efficient in its use and increases heater life substantially over the life of conventional cartridge heaters inserted in a molding orifice nozzle, and a nozzle unit which is easy to replace when no longer serviceable.

Other objects and advantages of the invention will become apparent with reference to the following description and the accompanying drawings.

In the drawings:

FIG. 1 is a fragmentary sectional view of an insulated runner system incorporating an illustrative embodiment of the novel improved heated nozzle.

FIG. 2 is an elevational view of a heater element.

FIG. 3 is a central sectional view of the torpedo casing for the nozzle.

FIG. 4 is an enlarged fragmentary central sectional view of the heater-casing assembly for the torpedo before sealing the insert end thereof and before compression of the casing.

FIG. 5 is a diametrical sectional view of the torpedo heater-casing assembly taken on line 5—5 of FIG. 4.

FIG. 6 is an axial sectional view of the completed heated torpedo device for a molding nozzle.

FIG. 7 is an end view of a modified torpedo made according to the invention and having multiple heater elements therein.

DESCRIPTION OF A PREFERRED EMBODIMENT

Figure 9:
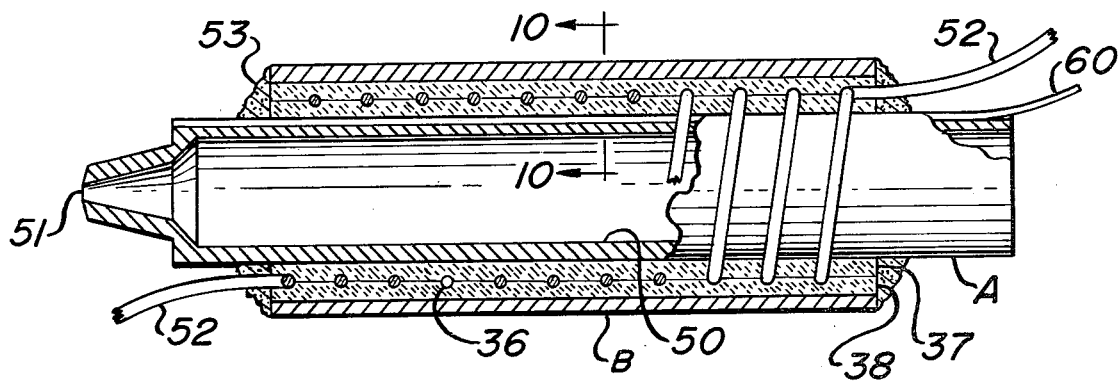
FIG. 9 is an axial sectional view of a modified form of heated nozzle.

Referring to the exemplary disclosure in the accompanying drawings, and particularly to FIG. 1, the electrically heated torpedo device 10 is of a type that is mounted in the molding head 11 of a plastic injection molding machine in a manner that enables it to function as a needle valve or nozzle for the injection orifice 12 leading from the runner 13. The heated torpedo device may include an externally flanged fitting or collar 14 which is seated on a shoulder 15 formed in a stationary plate 16. A threaded cap plug 17 may retain the torpedo device in place.

Specifically, the heated torpedo device 10 is fabricated from a cylindrical metal casing 18 (see FIG. 3) having an axial bore 19 which extends substantially the length of the casing and terminates short of one end thereof. The other or open end of said casing has a reduced diameter flange 21 surrounding its open end.

This casing receives therein an unsheathed heating element 22.

As best shown in FIGS. 2 and 4, the heating element 22 comprises a resistance wire 23 which is wound tightly upon a ceramic core 24 which is of a diameter loss than the diameter of the bore 19 in the casing, but shorter in length. The core has two holes extending from end to end which receive lead pins or wires 25 projecting beyond the ends of the core, as shown. One end of the wound resistance wire 23 is secured electrically to one of the leads, whereas the other end of said resistance wire is connected electrically to the other of the leads.

Arranged at each end of the core, with the leads 25 extending therethrough, is a thin frangible ceramic spacer 26, also slightly smaller in diameter than the diameter of the bore 19. With this heating element assembly inserted into the bore 19, as best shown in FIG. 4, heat transmitting material such as magnesium oxide powder 27 or similar material is placed in the space between the heating element 22 and the casing 18, whereupon a mica or lava washer 28 and a nylon washer 29, having holes therein to permit passage of leads 25, are fitted into the open end of bore 19 firmly against one another and against the related end of the heating element 22.

The assembly is vibrated to pack the magnesium oxide powder tightly within the casing, as to fill all air voids within the assembly, and the casing flange 21 is then spun, or rolled over into the nylon washer 29. The nylon washer may be removed to provide a flat end after swaging, as best shown in FIG. 6. This procedure tightly locks the heating element 22 and the magnesium oxide powder 27 within the casing.

The assembly of the metal casing 18 and heating element 22 is then swaged, so as to reduce the diameter of the casing and to compress the packed magnesium oxide powder 27 into all voids within the bore 19. This provides an effective heat transfer contact between the heating element 22 and the casing 18, and insures uniform heating of the casing and electrically insulates the heating element from the casing. The closed casing end may be tapered, as at 31, or otherwise shaped, preferably by milling, thus providing a surface to regulate the flow of material through the runner orifice 12. The construction also insures the location of the heating element 22 very close to the body end 31 and effective to heat the flow of material, and on the whole permits lowest internal operating temperatures with the application of highest watt density. Temperatures can be controlled by a thermocouple, in which case the lead 32 may be embedded in the magnesium oxide powder, or a thermocouple well may be utilized with the thermocouple probe slipped therein.

The flanged fitting or collar 14 is then welded to the metal casing and the extending ends of the lead wires 25 are encased in ceramic sleeves 33 and laid in a radial trough 34 formed in the collar. Said wires are then connected to suitable wires leading to a source of electric current.

DESCRIPTION OF A MODIFIED PREFERRED EMBODIMENT

Figure 8:
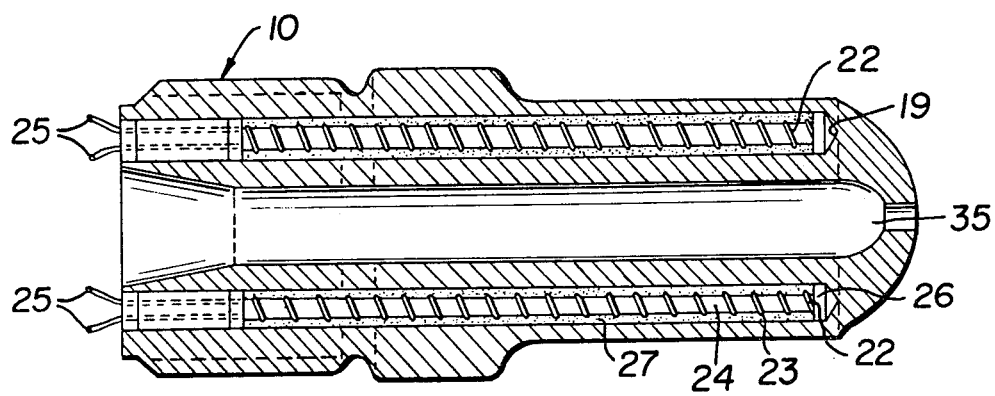
FIG. 8 is a sectional view along the axis of the nozzle of a die casting machine, taken on line 8—8 of FIG. 7.

In the FIGS. 7 and 8 disclosure, the heated nozzle is of a type having three heating elements 22 spaced about the central flow orifice 35, and the heater cores 24 are encased in the bores or wells 19 and integral with the nozzle body 10, as disclosed hereinabove with respect to the single heater torpedo. Such a structure is particularly useful in a nozzle for a die casting machine.

DESCRIPTION OF A SECOND MODIFIED PREFERRED EMBODIMENT

Figure 10:
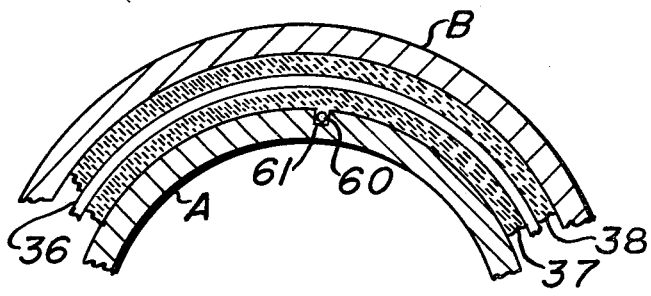
FIG. 10 is an enlarged fragmentary diametrical sectional view of the heated nozzle shown in FIG. 9.

The FIGS. 9 and 10 disclosure is concerned with a modified form of nozzle wherein a strip 37 of material having organically bound green ceramic particles is wound upon a core A, preferably steel, and resistance wire 36 is wound upon the material 37; and a second layer 38 is wound upon the resistance wire 36. A metal tube B is telescoped over the wire wound ceramic material, and the entire assembly is compressed together, as by swaging or rolling, to bring the materials into intimate contact with one another; after which the assembly is heated to bake out the binders and sinter the ceramic particles into a unitary mass embedding therein the heater wire 36.

A second compression operation, as by swaging, may be performed after the baking step, to further increase the density of the ceramic insulation, which further enhances heat transfer characteristics by further eliminating small voids in the assembly which may have resulted during carbonization of the heat dissipatable material and sintering of the ceramic particles.

The strips 37 and 38 before baking each comprise a layer body of "green" ceramic particles pressed and rolled to a high density, and bonded together with vaporizable binder material, which may be organic in nature, to a desired thickness. The ceramic particles are typically powdered ceramic materials such as particles of aluminum oxide or boron nitride. The binders are typically rubber, varnish, glyptal or the like. These bonded "green" or unbaked ceramic particles units conventionally are used in the fabrication of ceramic underlayment for printed circuits, the end product, when baked out or carbonized, being referred to as "ceramic substrata", but in their green state before baking they are pliable and bendable. When baked, the ceramic particles are sintered and agglomerate into a ceramic mass.

After the assembly is compressed into a unitary mass, the assembly may be machined to a selected configuration, as to thread the core A or metal tube B. The core A may comprise rod stock, in which case the core may be drilled to provide an annular channel 50 and shaped to provide a discharge orifice 51 for molten material. Leads 52 may be attached to the ends of the resistance wire 36, and heat resistant cement 53 or other suitable material may be used to seal the lead connections and peripheral space between the core A and metal tube B.

DESCRIPTION OF A THIRD MODIFIED PREFERRED EMBODIMENT

Figure 11:
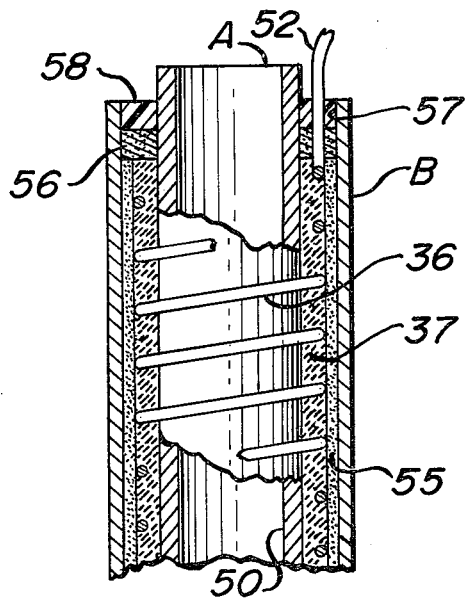
FIG. 11 is an enlarged fragmentary sectional view of a modified heated nozzle.

In the FIG. 11 embodiment, resistance wire 36 is wound on the layer 37 of green ceramic substrate, in the same manner as shown in FIGS. 9 and 10, but, instead of the application of a second substrate layer, the metal tube B is slipped loosely over the assembly and the void between the tube and wire wound ceramic substrate is packed and filled with insulating powder 55 in the manner described in the FIGS. 1-7 disclosure.

Preferably, the powder 55 is vibrated into packed position, and a lava disc 56 may be installed in the end recess 57 of the space between the core and tube to seal the ends, whereupon the assembly is baked to burn out the binders in the manner described. A plastic bushing 58 may be inserted into the recess to hold the elements in position, whereupon the assembly is swaged to eliminate air gaps therein and the plastic bushings may be trimmed from the ends and the unit machined in the manner described with reference to the FIGS. 9 and 10 disclosure.

OTHER MODIFICATIONS

As shown in FIG. 10, a hypodermic needle type thermocouple well 60 may be installed in the nozzle for reading the temperature, preferably by forming a groove 61 in the outer wall of the core A.

When baking out the ceramic substrate layers 37 and 38, the baking temperature should be below the melting point of the metal core and tube covering, preferably in an oxygen atmosphere, as to vaporize and carbonize the binders and oxidize the carbon, which is vented from the assembly in the form of carbon dioxide. As a result of this process, the ceramic material agglomerates into an integral heat conducting and electrically insulating mass.

Fabrication time is significantly reduced where the nozzle is made according to the FIG. 11 disclosure as the baking step is time consuming, and the insulation powder requires no such baking. Also the use of different insulation materials as shown in FIG. 11 permits the substrate layer 37 to be fabricated from material of good electric insulating properties, but high heat conductive characteristics, and the powder layer 55 may have high electric insulating properties and high heat insulating characteristics, so that the heat is directed to the flow channel within core A and the outer wall of metal tube B is of a lesser temperature.

Applicant has tested (see affidavit of Crandell in application Ser. No. 516,618, now U.S. Pat. No. 3,970,821, granted July 20, 1976) conventional heater structures to the structure shown in FIGS. 1 through 8 and has concluded from these tests that integral heated nozzles and torpedos provide far superior even distribution of heat from body to tip than conventional assemblies, to provide superior control of plastic fluidity in the main sprue area and gate area without 'freeze-up' or degradation of plastic, during injection molding processes.

It was also observed that the integral heated torpedo and nozzle units eliminate fit problems, voids and air gaps typical of conventional torpedo type and nozzle assemblies, provide longer heater life and allow higher wattage value. The same efficiencies are provided in the modified structures disclosed herein.

Although I have described preferred embodiments of the invention in considerable detail, it will be understood that the description thereof is intended to be illustrative rather than restrictive, as details of the structure and the steps of the method may be modified or changed without departing from the spirit or scope of the invention. Accordingly, I do not desire to be restricted to the exact construction and steps of the method described and shown.

I claim:

1. The method of making an integral heated torpedo for a molding nozzle which comprises winding a wire resistor upon a core having an opening therein extending the length thereof, extending a lead wire through said opening, connecting the end of said wire resistor to said lead wire, placing a ceramic spacer at each end of said core, inserting the core and spacers unsheathed into the open bore of a casing comprising a torpedo body closed at one end, filling the bore with heat transfer electrical insulation material to fill all voids in said bore between said core and spacers and said casing, placing an insulated washer in the open end of the bore, swaging the casing to reduce the diameter thereof and to pack the insulation material tightly around the core and in all gaps in the bore, and shaping the closed end of the casing.

2. The method recited in claim 1, with the addition of flanging the casing to lock the washer therein.

3. The method recited in claim 1, with the addition of placing a plastic washer between the insulated washer and the related open end of the bore, and removing the plastic washer after swaging.

4. The method recited in claim 1, with the addition of mounting a flanged collar on the casing at the end thereof opening to said bore.

5. The method recited in claim 1, with the addition of vibrating the filled casing before swaging to pack down the insulating material.

6. The method recited in claim 1, with the addition of inserting a thermocouple element into the casing before the casing is filled with insulating material.

7. In a method for making an electrically heated nozzle having a passage for injection of molten material into a forming cavity, said method comprising the steps of forming a bore in the nozzle body in proximity to the material injection passage, filling the bore with an unsheathed assembly of a winding of electric heater resistance wire embedded in heat transfer electrical insulation material without air gaps between said wire and said material, compressing the filled nozzle body to substantially eliminate all air voids in the assembly and between said assembly and said bore and to pack the insulation densely within said bore, connecting lead wires to the ends of said winding, and sealing said assembly in said bore.

8. The method recited in claim 7, with the additional step of shaping the exterior of said nozzle after the filled nozzle body has been compressed.

9. The method recited in claim 7, with the additional steps of forming a groove in the bore and inserting a thermocouple in said groove before said nozzle body has been compressed.

10. The method recited in claim 7, wherein said nozzle body comprises a tube and a casing, and said bore is formed in the space between said tube and casing by telescoping said tube over said casing.

11. The method recited in claim 10, wherein at least a portion of said insulation material comprises a sheet of green ceramic particles embedded to a high density in binders of heat dissipatable material, and with the additional steps of covering the exterior surface of said casing with said sheet, winding said electric resistance wire around said sheet and casing, and heating said wire wound sheet and casing to dissipate said binders.

12. The method recited in claim 7, with the additional step of vibrating the assembly prior to compressing to pack the insulation material around the winding and in the bore.

13. The method recited in claim 7, wherein the insulation material comprises green ceramic particles embedded to a high density in binders of heat dissipatable material, and with the additional step of heating the assembly to burn out the binders and sinter the ceramic particles into an agglomerated mass.

14. The method recited in claim 11, wherein the balance of said insulation material comprises powdered ceramic material, and said bore filling step comprises packing said bore with said powdered ceramic material.

* * * * *